Figure 1:
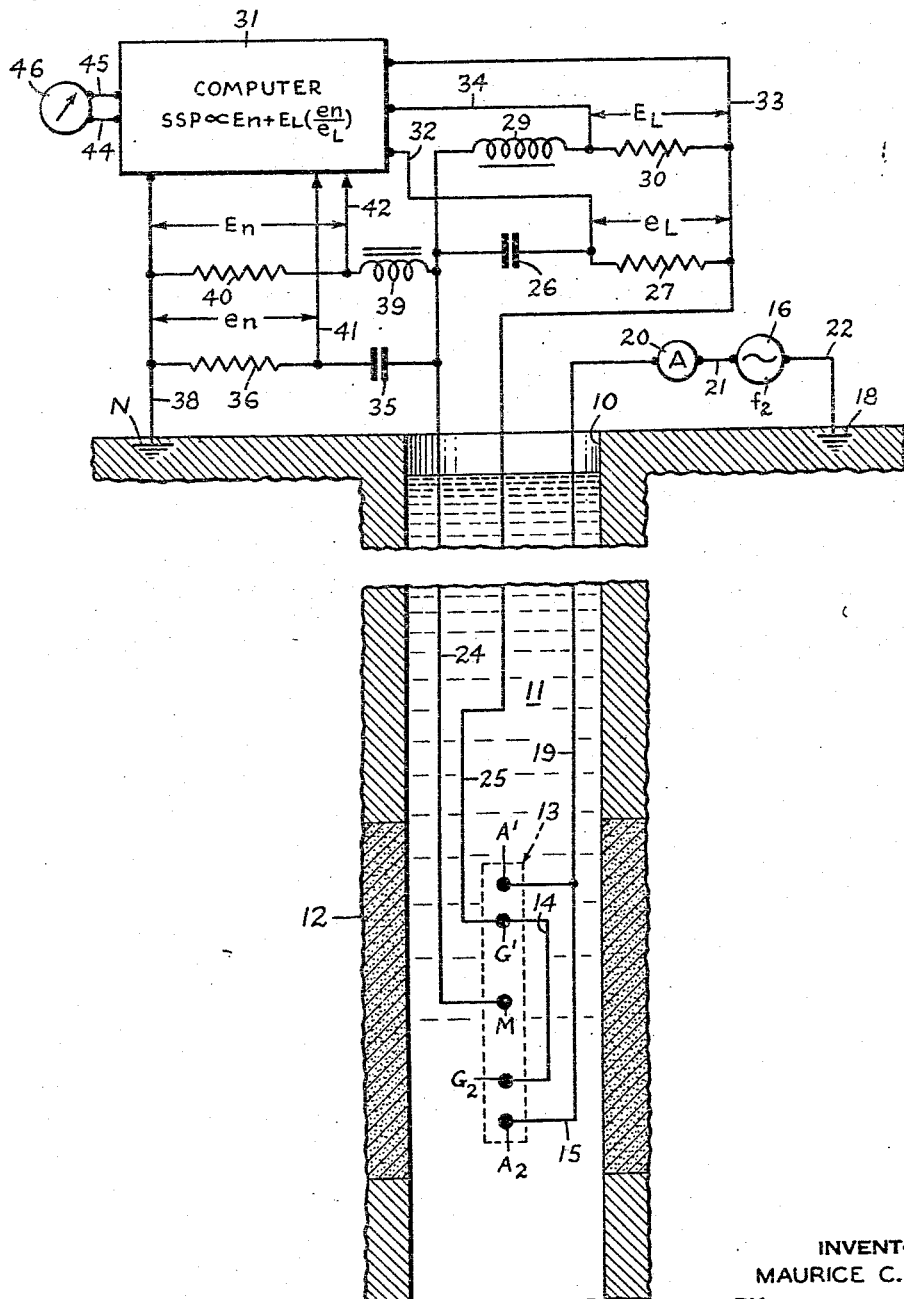

Nov. 5, 1957     M. C. FERRE     2,812,490
STATIC SPONTANEOUS POTENTIAL WELL LOGGING SYSTEMS
Filed June 18, 1953     2 Sheets-Sheet 1

INVENTOR.
MAURICE C. FERRE
HIS ATTORNEYS.

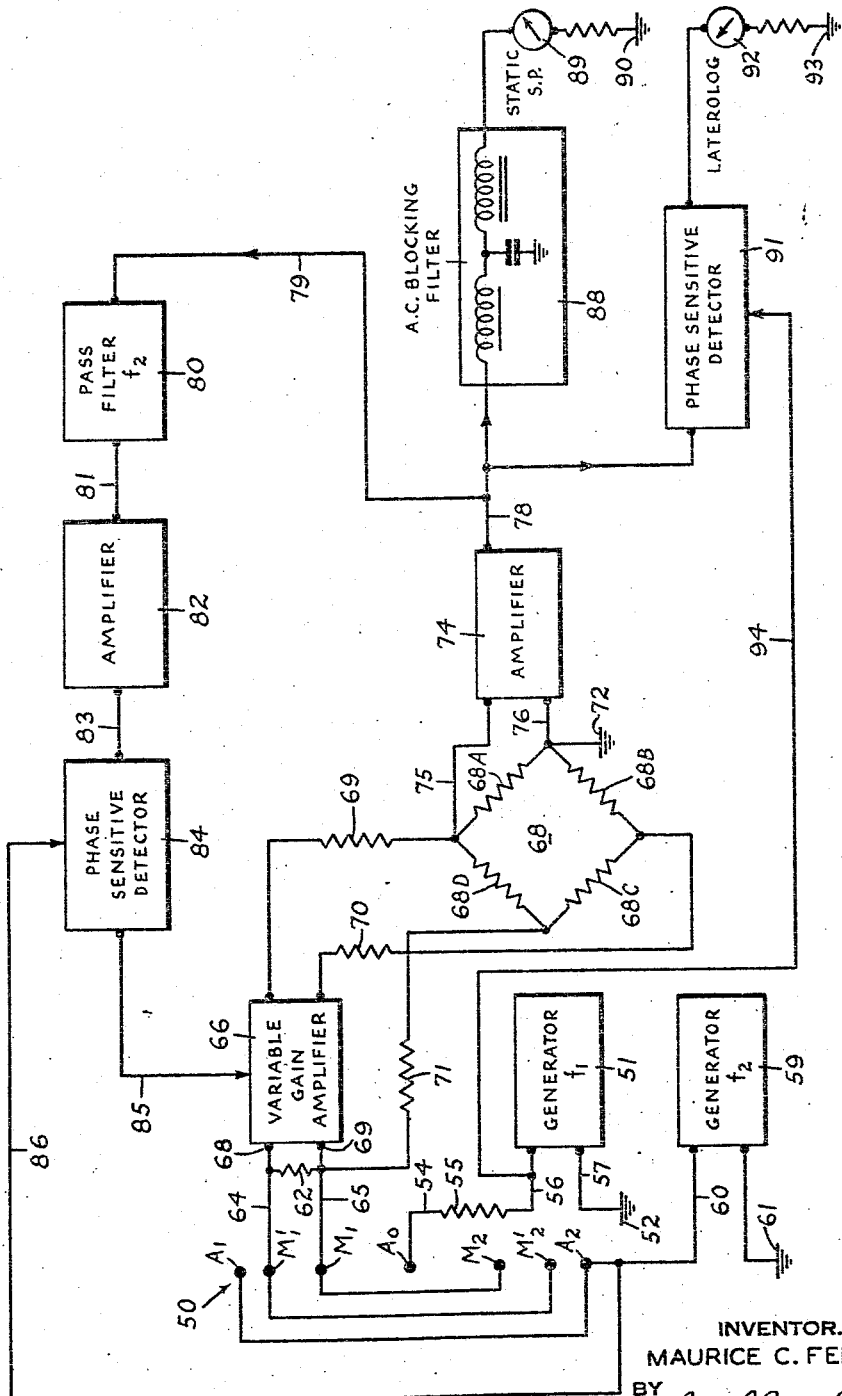

United States Patent Office 2,812,490
Patented Nov. 5, 1957

2,812,490

STATIC SPONTANEOUS POTENTIAL WELL LOGGING SYSTEMS

Maurice C. Ferre, Ridgefield, Conn., assignor, by mesne assignments, to Schlumberger Well Surveying Corporation, Houston, Tex., a corporation of Texas Application June 18, 1953, Serial No. 362,586

9 Claims. (Cl. 324—1)

The present invention relates to electrical well logging and more particularly to novel methods and apparatuses for obtaining indications that are closely related to the static spontaneous potentials of earth formations traversed by a bore hole containing an electrically conductive drilling liquid.

In the copending application Serial No. 293,242, for "Methods and Apparatuses for Logging Spontaneous Potentials in Wells," filed June 13, 1952, by Henri-Georges Doll, now Patent No. 2,728,047, a highly detailed and improved spontaneous potential log may be obtained by combining quantities which are combined functions of the spontaneous potentials and of the resistivities of the formations at the same levels within a bore hole. However, for these logs to be substantially equal at all levels to the "static SP," as obtained in accordance with the Patent No. 2,592,125, granted to Henri-Georges Doll, either a quantity that is a function of the second derivative of the spontaneous potentials with respect to the depth of the earth formations must be also introduced, thereby complicating the combination of the various quantities, or the logging speed must be maintained constant, thereby putting undesirable limitations on the logging operation.

It is an object of the invention, accordingly, to provide novel methods and apparatuses for obtaining indications that are substantially representative of the static SP of formations traversed by a bore hole.

Another object of the invention is to provide novel methods and apparatuses of the aforementioned character, which overcome the disadvantages noted above.

A further object of the invention is to provide novel methods and apparatuses for obtaining static SP indications, which may be combined readily with other types of detailed logging operations, yet in which there is no substantial possibility of undesirable electrode polarization, which may exist in certain combinations of methods and apparatuses of this nature.

These and other objects are attained, in accordance with the invention, by combining values respectively proportional to a plurality of potential differences obtained in a bore hole in a novel manner such that the resultant value is substantially equal to the static SP. Two of the potential differences employed result from the flow of spontaneous current in the bore hole; and two other of the potential differences result from the flow of current induced in the bore hole by an appropriate source and are thus related to the resistivity of the surrounding media. In addition, the present invention is adapted for combination with other logging operations, particularly since the potentials resulting from the induced current flow may have separate utility.

The invention will be understood more readily by reference to the following detailed description taken in conjunction with the accompanying drawing, in which:

Fig. 1 is a schematic diagram of one embodiment of the invention for obtaining indications of the static spontaneous potentials of the earth formations traversed by a bore hole; and Fig. 2 is a schematic diagram of another embodiment employed for obtaining static SP logs, in combination with electrical resistivity logging apparatus, in accordance with the invention.

Referring to Fig. 1, a bore hole 10 containing a conductive drilling fluid 11 is shown traversing a plurality of earth formations 12. An electrode array 13, which may be of the type disclosed in Fig. 1 of the aforementioned Doll Patent No. 2,592,125 may be adapted to be passed through the bore hole 10 by an electric cable winch combination (not shown). The electrode array 13 may comprise a centrally disposed electrode M, the electrodes $G_1$ and $G_2$ disposed on either side of the electrode M and interconnected by an insulated short-circuiting conductor 14, and the electrodes $A_1$ and $A_2$ disposed at the opposite ends of the electrode array 13 and, similarly connected by an insulated shortcircuiting conductor 15.

As is well known, a potential difference $E_n$, will exist between the electrode M and the reference point N, as a result of the flow of spontaneous potential current in the conductive drilling fluid 11. Also, as a result of the spontaneous potential currents flowing in the drilling fluid 11, there will exist a differential potential $E_L$ between the electrodes M, and $G_1$ and $G_2$. If alternating current of the frequency $f_2$ is passed between the electrodes $A_1$ and $A_2$ and the ground 18, an A. C. potential difference $e_n$ will exist between the electrode M and the reference point N, and an A. C. differential potential $e_L$ will exist between the electrodes M, and $G_1$ and $G_2$.

I have discovered that a signal SSP which is substantially equal to the static SP obtained in accordance with the aforementioned Doll Patent No. 2,592,125 may be obtained by combining the above-mentioned four voltages, in accordance with the following relation:

$$SSP \propto E_n + E_L\left(\frac{e_n}{e_L}\right) \qquad (1)$$

This relation may be continuously derived in any convenient manner as the electrode array 13 is passed through the bore hole 10. For example, an A. C. source 16 of convenient frequency $f_2$ may be connected between the electrodes $A_1$, $A_2$ and the ground 18 by a circuit including an insulated cable conductor 19, an ammeter 20 and the conductors 21 and 22. The frequency $f_2$ is preferably relatively low and may be, for example, 60 or 400 cycles. The potentials existing on the electrodes M and $G_1$, $G_2$ may be brought to the surface of the earth by means of the insulated cable conductors 24 and 25, respectively. The conductor 24 may be connected to a ground electrode N through a conductor 38, a relatively high resistance 40 and suitable A. C. blocking means 39 whereby the D. C. potential $E_n$ will appear across the resistor 40. The conductor 24 may also be connected to the ground N through a high resistance 36 and suitable D. C. blocking means 35, whereby the A. C. potential $e_n$ will appear across the resistor 36.

Bridging the conductors 24 and 25 is a circuit including a high resistance 30 and A. C. blocking means 29 whereby the D. C. differential potential $E_L$ will be developed across the resistor 30. The conductors 24 and 25 may also be bridged by a high resistance 27 and D. C. blocking means 26 in series such that the A. C. differential potential $e_L$ will appear across the resistor.

As the electrode array 13 is passed through the bore hole 10, the four potentials appearing across the resistances 27, 30, 36 and 40, respectively, may be applied to appropriate computing apparatus 31 to give an output in accordance with the Relation 1 above. Thus, the computer 31 receives the voltage $E_n$ through the conductors 38 and 42; the voltage $e_n$ through the conductors 38 and 41; the voltage $E_L$ through th econductors 33 and 34; and the voltage $e_L$ through the conductors 32 and 33. The output of the computer 31 may be fed through the conductors 44 and 45 to a recording galvanometer 46 which is adapted to make a record of the static SP as a function of the depth of the electrode M in the bore hole.

The computer 31 may be of any convenient type, such as that shown in the copending application Serial No. 292,073, for "Well Logging Methods and Apparatus," filed June 6, 1952, by Nick A. Schuster, adapted to operate on the D. C. potential inputs provided by the above described apparatus, in accordance with the present invention.

It can thus be seen that a novel and highly effective method and apparatus are provided for obtaining, continuously, indications of the static SP of the earth formations during the logging operations.

It will be understood by those skilled in the art that a conventional SP measurement may also be obtained, as for example, by recording the potential $E_n$. Further, the potentials $e_n$ and $e_L$ may be recorded as a function of the resistivity of the material surrounding the bore hole 10. If the potentials $e_n$ and $e_L$ are to be recorded, the A. C. source 16 should be preferably of the constant current type.

In Fig. 2 there is shown apparatus whereby the invention may be conveniently combined with the apparatus of the aforementioned Schuster application Serial No. 292,073 in order to obtain simultaneously indications of the SP and of the resistivity of the formation material in a particular predetermined path.

An electrode array 50 may comprise a centrally disposed current emitting electrode $A_0$ and pairs of shortcircuited electrodes $M_1$ and $M_2$, $M_1'$ and $M_2'$, and a pair of shortcircuited current emitting electrodes $A_1$ and $A_2$. An alternating current generator 51, having a frequency $f_1$, may be connected between the current emitting electrode $A_0$ and a ground or reference point 52 by circuit means including a conductor 54, a high resistance 55, a conductor 56, and a conductor 57. The current emitting electrodes $A_1$ and $A_2$ may be energized by an alternating current generator 59, having a frequency $f_2$, through a conductor 60, the alternating current generator 59 also being connected to a ground 61.

The potential differences between the pairs of electrodes $M_1$ and $M_2$, and $M'_1$ and $M'_2$ may be fed through the conductors 64 and 65 to a high resistance 62 which is bridged across the input terminals 68 and 69 of a variable gain amplifier 66. The output of the variable gain amplifier 66 may be connected through the decoupling resistors 69 and 70, respectively, to two opposite junctions of a resistance bridge 68 having four resistance arms 68A, 68B, 68C and 68D. Of the two remaining junctions of the bridge 68, one is connected to ground at 72 and the other is connected through a decoupling resistor 71 and the conductor 65 to the electrodes $M_1$ and $M_2$.

Any potentials developed across the bridge resistance 68A may be connected to the input terminals of an amplifier 74 by the conductors 75 and 76. The output of the amplifier 74 may be connected by conductor means 78 and conductor means 79 to the input of a filter 80, which may be adapted to pass the frequency $f_2$. The output of the filter 80 is in turn connected to a phase sensitive detector 84 through conductor means 81, an amplifier 82 and conductor means 83. The output of the phase sensitive detector 84 is fed to a gain control element in the variable gain amplifier 66 by conductor means 85. The phase sensitivity of the detector 84 may be controlled by the alternating current generator 59 through the conductor means 60 and 86. The circuit including the filter 80, the amplifier 82, the phase sensitive detector 84 and the conductor means 79, 81, 83 and 85 constitutes a degenerative feedback path for controlling the gain of the amplifier 66.

A portion of the output of the amplifier 74 may be fed through the conductor means 78 and an A. C. blocking filter 88 to one terminal of a high impedance galvanometer 89, the other terminal of which is connected to a ground or reference point 90. Still another portion of the output of the amplifier 74 may be fed through the conductor 78 and a phase sensitive detector 91 to one terminal of a high impedance galvanometer 92 having its other terminal connected to a ground or reference point 93. The phase sensitivity of the detector 91 may be controlled by the alternating current generator 51 through conductor means 94.

As the electrode array 50 is moved through a bore hole containing a conductive fluid, the following potential differences will exist:

$E_n$ = a D. C. potential difference between the electrodes $M_1$ and $M_2$ and ground, resulting from the flow of spontaneous potential currents in the bore hole;

$E_L$ = a D. C. potential difference between the electrodes $M_1$ and $M_2$ and the electrodes $M_1'$ and $M_2'$, resulting from the flow of spontaneous potential currents in the bore hole;

$e_{n1}$ = an A. C. potential difference of the frequency $f_1$ between the electrodes $M_1$ and $M_2$ and ground;

$e_{L1}$ = an A. C. potential difference of the frequency $f_1$ between the electrodes $M_1$ and $M_2$, and the electrodes $M_1'$ and $M_2'$;

$e_{n2}$ = an A. C. potential difference of the frequency $f_2$ between the electrodes $M_1$ and $M_2$ and ground; and $e_{L2}$ = an A. C. potential difference of the frequency $f_2$ between the electrodes $M_1$ and $M_2$, and $M_1'$ and $M_2'$.

As indicated above, the static SP may be obtained, according to the invention, by solving the following relation:

$$SSP \propto E_n + E_L \left(\frac{e_{n2}}{e_{L2}}\right) \qquad (1A)$$

Further, the aforementioned Schuster application discloses that a resistivity value R proportional to the formation resistivity in a predetermined path may be obtained by solving the following relation:

$$R \propto e_{n1} + e_{L1}\left(\frac{e_{n2}}{e_{L2}}\right) \qquad (2)$$

It will be noted that both Relations 1A and 2 contain the factor $$\left(\frac{e_{n2}}{e_{L2}}\right)$$

This circumstance enables static SP values to be obtained in a novel and highly effective manner according to the present invention, together with the resistivity values obtainable with the systems described in the abovementioned Schuster application, in one apparatus employing the novel computer disclosed in said Schuster application, as described in detail below.

Considering for the moment only the potentials $e_{n2}$ and $e_{L2}$ of the frequency $f_2$, the potential $e_{n2}$ between the electrodes $M_1$, $M_2$ and the ground 72 is applied through the decoupling resistor 71 across one diagonal of the bridge 68, resulting in the production of a potential proportional to $e_{n2}$ across the resistor 68A. The potential $e_{L2}$ developed across the high resistance 62 is applied to the input terminals of the variable gain amplifier 66 which has a variable gain G. This results in an output $Ge_{L2}$, which is applied by means of the balanced decoupling resistors 69 and 70 across the other diagonal of the bridge 68. Thus, the potential at the frequency $f_2$ across the resistor 68A is equal to $e_{n2} - Ge_{L2}$. This potential is applied to the input of the amplifier 74. The output of the amplifier 74 is then applied through the degenerative feedback circuit comprising the filter 80, the amplifier 82 and the phase sensitive detector 84, to control the gain of the variable gain amplifier 66. Since the degenerative feedback control potential is proportional to $e_{n_2} - G e_{L_2}$, the potential $G e_{L_2}$ tends continuously to be substantially equal to the potential $e_{n_2}$, whereby the gain of the variable gain amplifier 66 will be continuously equal to $$\left(\frac{e_{n2}}{e_{L2}}\right)$$

Thus, the gain of the variable gain amplifier 66 is equivalent to the common factor appearing in both the Relations 1A and 2.

Since the variable gain amplifier 66 is designed to have substantially the same gain for D. C. operation and for operation at the frequencies $f_1$ and $f_2$, a D. C. potential proportional to $E_n$ appears directly across the resistor 68A. Also across the resistor 68A, there is developed a D. C. potential proportional to $GE_L$, which, as indicated above, is equal to $$E_L \left(\frac{e_{n2}}{e_{L2}}\right)$$

Thus, a D. C. potential proportional to the static SP, in accordance with the Relation 1A, above, appears at the output terminals of the amplifier 74. This D. C. potential may be filtered out by the A. C. blocking filter means 88 and recorded by means of a high impedance recording galvanometer 89.

Also appearing across the resistor 68A is an A. C. potential of the frequency $f_1$ which is proportional to $e_{n_1}$. To this, from the output of the variable gain amplifier 66, is added the potential $G e_{L_1}$ which, as indicated above, is made continuously equal to $$e_{L1}\left(\frac{e_{n2}}{e_{L2}}\right)$$

Thus, a signal of a frequency $f_1$ appears in the output of the amplifier 74. This signal is continuously proportional to the resistivity R given by the above-mentioned Relation 2 and it is applied to the input of the phase sensitive detector 91, which is responsive to a reference signal of the frequency $f_1$ supplied through the conductor 94. Accordingly, a D. C. signal proportional to R is derived by the phase sensitive detector 91 which is recorded simultaneously with the static SP by means of the recording galvanometer 92.

It can thus be seen that convenient methods and apparatuses may be provided, in accordance with the invention, for obtaining in a highly effective manner either continuous indications of the static SP within the bore hole, alone or simultaneously with resistivity indications, in accordance with the disclosure in the aforementioned Schuster application.

It will be understood that the above embodiments are merely exemplary and that they are susceptible of modification and variation without departing from the spirit and scope of the invention. For example, if it is found desirable not to employ D. C. amplifiers, the two D. C. potentials $E_n$ and $E_L$ may be filtered directly from the electrode array 50 in Fig. 2 and transformed, for example, by means of a chopper into A. C. signals of frequency $f_3$, having amplitudes proportional to the D. C. signals. These signals, in turn, may be applied to the input of the computer apparatus and the remaining operation may be conducted at a frequency $f_3$. Further, the gain G of the amplifier 66 in Fig. 2 may be adjusted to be continuously equal to $$K\left(\frac{e_{n2}}{e_{L2}}\right)$$

where K is greater than unity. This may be done for either D. C. operation or operation at a frequency $f_1$, or both, thereby providing even more detailed logs under certain circumstances. It also will be apparent that the computer apparatus of either Figs. 1 or 2 may be located either in the bore hole near the electrode array or at the surface of the earth. Accordingly, the invention is not deemed to be limited to the specific embodiments disclosed but its scope is defined in the appended claims.

I claim:

1. In a method for investigating earth formations traversed by a bore hole containing electrically conductive fluid, the steps of: disposing at least two electrodes in fixed longitudinally spaced relation in the bore hole; establishing a periodically varying electrical field in the vicinity of said electrodes; obtaining signals representative of periodically varying potential difference attributable to said field between one of said electrodes and a reference point substantially at ground potential, of periodically varying potential difference attributable to said field between said electrodes, of potential difference attributable to spontaneous potentials in the bore hole between said one electrode and a reference point substantially at ground potential, and of potential difference attributable to said spontaneous potentials between said electrodes; and exhibiting a function of said potential differences.

2. In a method for investigating earth formations traversed by a bore hole containing electrically conductive fluid, the steps of: disposing at least two electrodes in fixed longitudinally spaced relation in the bore hole; establishing a periodically varying electrical field in the vicinity of said electrodes; obtaining signals representative of periodically varying potential difference $e_n$ attributable to said field between one of said electrodes and a reference point substantially at ground potential, of periodically varying potential difference $e_L$ attributable to said field between said electrodes, of potentials $E_n$ attributable to spontaneous potentials in the bore hole between said one electrode and a reference point substantially at ground potential, and of potentials $E_L$ attributable to said spontaneous potentials between said electrodes; and exhibiting a function of said potential differences in accordance with the relation $$E_n + E_L\left(\frac{e_n}{e_L}\right)$$

3. In a method for determining the static spontaneous potential for earth formations traversed by a bore hole containing electrically conductive fluid, the steps of: disposing at least three electrodes in fixed longitudinally spaced apart relation in the bore hole; establishing a periodically varying electric field between two points in the vicinity of the outermost two of said three electrodes, respectively, and a reference point substantially at ground potentials; obtaining indications of periodically varying potential difference $e_n$ attributable to said field between the inner one of said electrodes and a reference point substantially at ground potential, of periodically varying potential difference $e_L$ attributable to said field between said inner electrode and said outermost electrodes, of potentials $E_N$ attributable to spontaneous potentials in the bore hole between said inner electrode and a reference point substantially at ground potential, and of potentials $E_L$ attributable to said spontaneous potentials between said inner electrode and said outermost electrodes; and exhibiting a function of said potential differences in accordance with the relation $$E_n + E_L\left(\frac{e_n}{e_L}\right)$$

4. In a method for investigating earth formations traversed by a well, the steps of: disposing at least two electrodes in fixed longitudinally spaced apart relation in the bore hole; establishing a first periodically varying electric field between one of said electrodes and a reference point substantially at ground potential; establishing a second periodically variable field, separably different from said first field, between the other of said electrodes and a reference point substantially at ground potential; obtaining indications of periodically variable potential difference $e_{n1}$ attributable to said first field between a first point intermediate said two electrodes and a reference point substantially at ground potential, of periodically variable potential difference $e_{L1}$ attributable to said first field between said first point and a nearby point, of potentials $E_N$ attributable to spontaneous potentials in the bore hole between said first point and a reference point substantially at ground potential, of potentials $E_L$ attributable to said spontaneous potentials between said first point and said nearby point, of periodically variable potential difference $e_{n2}$ attributable to said second field between said first point and a reference point substantially at ground potential, and of periodically variable potential difference $e_{L2}$ attributable to said second field between said first point and said nearby point; exhibiting a first function of certain of said potential differences in accordance with the relation $$E_n + E_L\left(\frac{e_{n1}}{e_{L1}}\right)$$

and exhibiting a second function of certain of said potential differences in accordance with the relation $$e_{n2} + e_{L2}\left(\frac{e_{n1}}{e_{L1}}\right)$$

5. In apparatus for investigating earth formations traversed by a bore hole, the combination of: at least three electrodes mounted for movement through the bore hole in fixed longitudinally spaced apart relation; a source of periodically variable electrical energy connected to one of said electrodes and to a reference point substantially at ground potential; circuit means connected to provide inputs of periodically varying potential difference between a second of said electrodes and a reference point substantially at ground potential and between said second electrode and the third electrode, circuit means connected to provide inputs of potentials attributable to spontaneous potentials in the bore hole between said second electrode and a reference point substantially at ground potential and between said second and third electrodes, and computer means connected to receive said inputs for exhibiting a function of said potential differences.

6. In apparatus for investigating earth formations traversed by a bore hole, the combination of: at least three electrodes mounted for movement through the bore hole in fixed longitudinally spaced apart relation; a source of periodically variable electrical energy connected to one of said electrodes and to a reference point substantially at ground potential; circuit means connected to provide inputs of periodically varying potential difference $e_n$ between a second of said electrodes and a reference point substantially at ground potential and $e_L$ between said second electrode and the third electrode, and of potentials $E_n$ between said second electrode and a reference point substantially at ground potential and $E_L$ between said second and third electrodes, said last named potentials being attributable to spontaneous potentials in the bore hole, and computer means connected to receive said inputs for exhibiting a function of said potential differences in accordance with the relation $$E_n + E_L\left(\frac{e_n}{e_L}\right)$$

7. In apparatus for investigating the static spontaneous potentials for earth formations traversed by a bore hole, the combination of a first electrode adapted for movement through the bore hole, shortcircuited electrode means disposed symmetrically above and below said first electrode in fixed spatial relation thereto, current emitting electrode means disposed symmetrically above and below said electrode means in fixed spatial relation thereto, a source of periodically varying electrical energy connected to said current emitting electrode means and to a reference point substantially at ground potential, means for separately detecting first and second potential differences between said shortcircuited electrode means and said first electrode resulting from current emitted by said current emitting electrode means and from naturally occurring currents in the bore hole, respectively, means for measuring third and fourth potential differences between said first electrode and a remote reference point at substantially ground potential resulting from current emitted by said current emitting electrode means and from naturally occurring currents in the bore hole, respectively, and computing means for combining all of said potential differences to yield a quantity representative of the static spontaneous potential.

8. Well logging apparatus for simultaneously determining the static spontaneous potential and the electrical resistivity of earth formations traversed by a bore hole containing electrically conductive fluid, comprising a first electrode adapted for movement through the bore hole, a source of electrical current of one characteristic distinguishably different from naturally occurring currents within the bore hole, said source of current of said one characteristic being connected between said first electrode and a remote reference point substantially at ground potential, at least three pairs of shortcircuited electrode means symmetrically disposed at different fixed distances above and below said first electrode, another source of electrical current of another characteristic distinguishably different from said one characteristic and from said naturally occurring currents within said bore hole, said another source being connected between the outermost pair of shortcircuited electrode means and a relatively remote reference point substantially at ground potential, means for detecting potential differences between the innermost pair of electrodes and an intermediate pair of electrodes, means for detecting potential differences between one of said pairs of shortcircuited electrodes and a remote reference point substantially at ground potential, means for combining detected potential differences resulting from the naturally occurring currents and from said current of said one characteristic to obtain a quantity representative of the static spontaneous potential of the formations, and means for combining detected potential differences resulting from said current of said one characteristic and from said current of said another characteristic to obtain a quantity representative of the electrical resistivity of the formations.

9. Well logging apparatus comprising a first electrode adapted for movement through the bore hole, a source of electrical current of one characteristic distinguishably different from naturally occurring currents within the bore hole, said source of current of said one characteristic being connected between said first electrode and a remote reference point substantially at ground potential, at least three pairs of shortcircuited electrode means symmetrically disposed at different fixed distances above and below said first electrode, another source of electrical current of another characteristic distinguishably different from said one characteristic and said naturally occurring currents within said bore hole, said another source being connected between the outermost pair of shortcircuited electrode means and a relatively remote reference point substantially at ground potential, first means for detecting potential differences between the innermost pair of electrodes and an intermediate pair of electrodes, second means for detecting potential differences between one of said pairs of shortcircuited electrodes and a remote reference point substantially at ground potential, variable gain amplifying means, having input means connected to said first potential difference detecting means, voltage combining means for combining the output of said variable gain amplifying means with potential differences detected by said second detecting means, degenerative feedback control means for said variable gain amplifying means responsive to the output of said voltage combining means resulting from potential differences produced by current of said another characteristic, indicating means responsive to the output of said voltage combining means resulting from potential differences produced by the naturally occurring currents, and indicating means responsive to the output of said voltage combining means resulting from potential differences produced by said current of said one characteristic.

References Cited in the file of this patent
UNITED STATES PATENTS

| | | |
|---|---|---|
| 2,206,892 | Hawley | July 9, 1940 |
| 2,317,259 | Doll | Apr. 20, 1943 |
| 2,770,771 | Schuster | Nov. 13, 1956 |